C. R. BROWN.
COMBINATION TRAP AND SORTING NEST.
APPLICATION FILED MAR. 3, 1914.
1,180,233.
Patented Apr. 18, 1916.
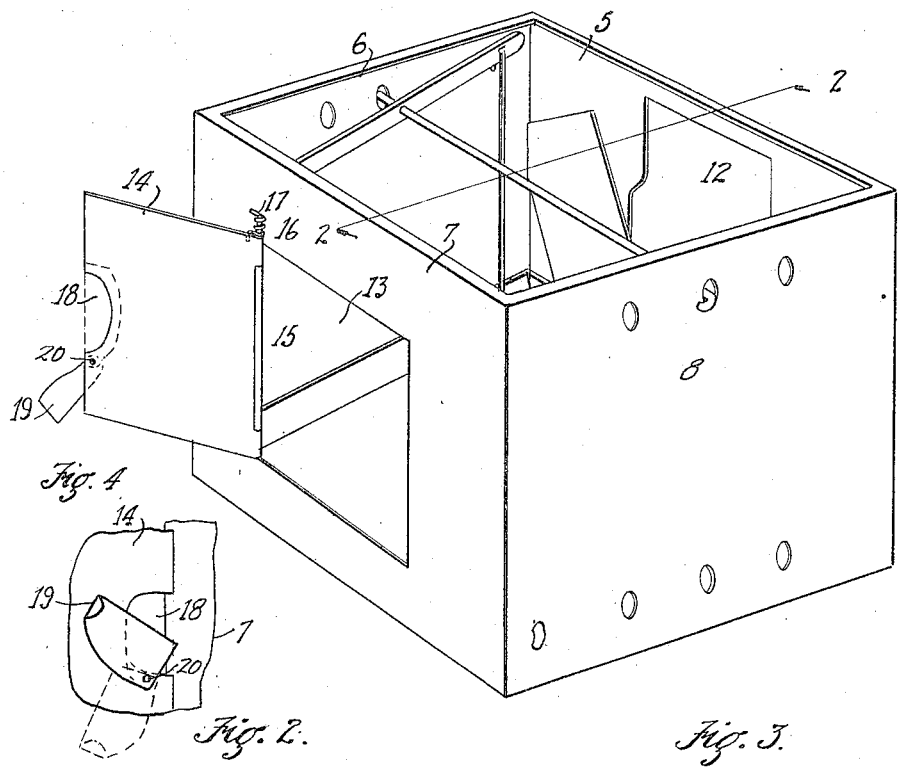
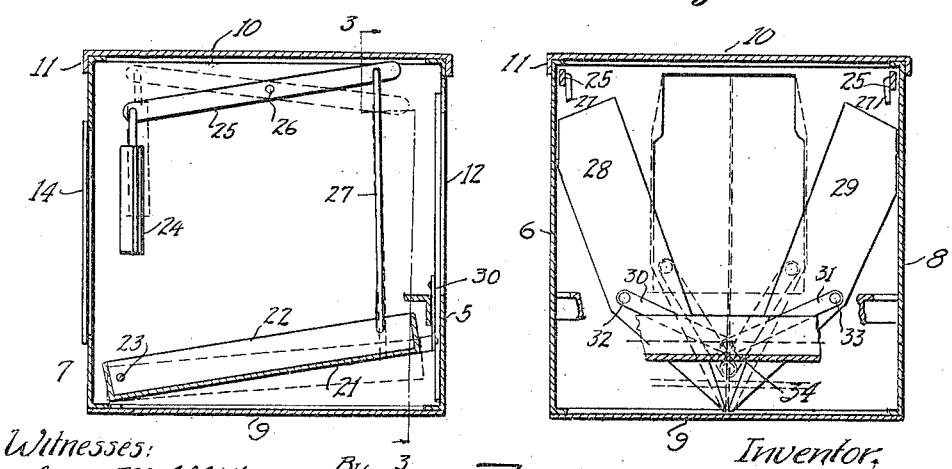
Witnesses:
James M. Abbott
Marie Battey
Inventor,
Christopher R. Brown.
by Howard & Howard
Att'ys.
THE COLUMBIA PLANOGRAPH CO., WASHINGTON, D. C.

UNITED STATES PATENT OFFICE.

CHRISTOPHER R. BROWN, OF LOS ANGELES, CALIFORNIA.

COMBINATION TRAP AND SORTING NEST.

1,180,233. Specification of Letters Patent. Patented Apr. 18, 1916.

Application filed March 3, 1914. Serial No. 822,124.

*To all whom it may concern:*

Be it known that I, CHRISTOPHER R. BROWN, a citizen of the United States, residing at Los Angeles, in the county of Los Angeles, State of California, have invented new and useful Improvements in Combination Trap and Sorting Nests, of which the following is a specification.

This invention relates to a hen's nest.

It is the object of this invention to provide a hen's nest which is normally open to permit the free entrance of a hen, but which automatically closes when the hen is within the nest to exclude other hens and prevent disturbance of the nesting hen.

Another object is to provide a nest of the above character in which the closing of the nest will be accomplished by the weight of the hen immediately on her entrance into the nest.

Another object is to provide a trap nest which can be utilized in either effecting the capture of the hen, or merely in serving to protect her from disturbance and permit her to escape from the nest.

Another object is to provide a nest which can be employed as a sorting nest in separating a large majority of the laying from the nonlaying hens.

A further object is to provide a trap nest having laterally swinging vertical entrance doors normally disposed in open position and adapted to be operated by the weight of the hen upon entering the nest to effect their closure.

The invention primarily resides in a box nest having an inlet opening, laterally swinging vertical doors for closing said opening, a false bottom within the nest, means connecting the false bottom and the doors whereby the weight of a hen on the false bottom will operate to close the doors and maintain them in their closed position, said box nest having a normally closed separate exit opening and means for automatically opening the entrance doors and maintaining them in open position as the hen leaves the nest.

The invention is illustrated in the accompanying drawings, in which:

Figure 1 is a perspective view of the nest with the cover removed. Fig. 2 is a view of the nest in vertical section as seen on the line 2—2 of Fig. 1 in the direction indicated by the arrows. Fig. 3 is a view in transverse section on the line 3—3 of Fig. 2, as seen in the direction indicated by the arrows. Fig. 4 is a detail in elevation of the exit door when in its closed position illustrating the means whereby the nest is converted into a trap nest.

In carrying out the present invention a box like structure is employed; this structure forming the nest inclosure and consisting of four side walls, 5—6—7 and 8 joined together at their vertical edges and connected together at their bottom edges by means of a bottom plate 9 and fitted with a top plate or cover 10. The cover 10 is formed with downwardly extending flanges 11 on its outer edge adapted to project over the side walls of the structure in slidable engagement therewith; the cover 10 being preferably removable to permit ready access to the interior of the structure for cleaning or adjusting.

Formed in the wall 5 is an entrance opening 12, and formed in the opposite wall 7 is an exit opening 13. The exit opening 13 is designed to be normally closed by means of a door 14 hinged at one of the vertical edges of the opening 13 as indicated at 15, in any suitable manner, and normally retained in its closed position by means of a coil spring 16 wound around the pivot pin 17 of the door hinge with one terminal bearing against the side wall 7, and the other end engaging the door 14. The door 14 is formed with a cutout open portion 18 on its forward edge, which opening may be closed when desired by means of a shutter 19 pivoted at 20 on the door, and adapted to be swung clear of the opening 18, as shown in full lines in Fig. 4, or to be moved over the opening 18 to close the opening as indicated in dotted lines in Fig. 1.

Mounted within the nest structure adjacent to the bottom 9 is a false bottom 21, provided with an upwardly projecting flange 22 which extends around its outer edge with the flanges lying adjacent the walls 6 and 8 pivotally connected to the latter by means of a rod 23, which rod passes through the side walls 6 and 8, and the flanges 22 adjacent to the edge of the false bottom 21 nearest the wall 7. The rod 23 forms a pivot on which the false bottom 22 can be rocked; the false bottom being normally retained in its uppermost position, indicated by full lines in Fig. 2, by means of counter-weights 24 suspended on the outer ends of levers 25 pivoted at 26 to the side walls 6 and 8; the opposite ends of the levers 25 being pivotally connected to links 27 which are connected at their lower ends to the opposite side of the flange 22 of the false bottom 21 adjacent its upper end.

Arranged adjacent the inner face of the wall 5 is a pair of laterally oscillating plates 28 and 29 which are formed of thin sheet material converging to points at their lower ends which normally rest on the bottom 9 to support the plates and form pivotal points therefor. These plates are designed to form closures for the entrance opening 12, and when in their closed position, as indicated in dotted lines in Fig. 3, the adjacent edges of the plates will abut against each other. These plates normally extend at opposite angles in relation to the vertical center of the opening 12, which is arranged mediate the side walls 6 and 8, with their upper ends resting against the inner faces of the side walls; the side walls 6 and 8 thus serving to limit the outward movement of the plates 28 and 29.

Connecting with the false bottom 21 opposite the vertical center of the entrance opening 12 is a pair of oppositely extending links 30 and 31 which are pivotally connected at 32 and 33 at their outer ends to the inner faces of the plates 28 and 29 adjacent their outer edges; the inner ends of the links 30 and 31 being pivotally connected together and to the false bottom 21 by a common pivot pin 34.

When the parts are in their normal positions the exit opening 13 will be closed by the door 14, and the entrance opening 12 will be opened by reason of plates 28 and 29 being in their retracted position as indicated in full lines in Fig. 3.

In the operation of the invention, when a hen passes through the entrance opening 12 and steps upon the pivoted false bottom 21, which contains the nesting materials, the weight of the hen will operate to move the upper outer end of the false bottom downwardly in opposition to the weights 24. This downward movement of the false bottom 21 will exert a pull upon the links 30 and 31, which action will operate to rock the plates 28 and 29 toward each other into their closed position, shown in dotted lines in Fig. 3, thereby effectively closing the entrance opening 12 and thus preventing the entrance of other hens into the nest. The plates 28 and 29 will be maintained in this closed position as long as the hen remains upon the nest on the false bottom 21.

If it is desired to trap the hen in the nest the shutter 19 is moved to its closed position, thus presenting no means of escape from the nest. If it is desired that the hen leave the nest, the shutter 19 is moved to its opening position as shown in full lines in Fig. 4 whereupon the hen in endeavoring to leave the nest will open the door 14.

As soon as the false bottom 21 is relieved of the hen's weight, the counterweights 24 will operate to restore the false bottom 21 to its normal uppermost position. The false bottom 21 in moving upward will act through the links 30 and 31 to retract the closure plates 28 and 29 to open the entrance opening 12, therefore placing the nest in readiness for another operation.

What I claim is:

1. In a nest, the combination with a box-like structure having an entrance opening thereto, of a pair of contiguous closure plates for opening and closing said opening fulcrumed at their lower inner corners and adapted to be oscillated in a vertical plane to and from each other, a rockable false bottom within said box-like structure, links, one for each plate connected to the plates and to said false bottom and so disposed as to lie close to the false bottom when the closure plates are in open position, and means operating on said false bottom for normally maintaining it in its upper position.

2. In a nest, the combination with a box-like structure having an entrance opening thereto, of a pair of contiguous closure plates for opening and closing said opening fulcrumed at their lower inner corners and adapted to be oscillated in a vertical plane to and from each other, a rockable false bottom within said box-like structure, links, one for each plate connected to the plates and to said false bottom and so disposed as to lie close to the false bottom when the closure plates are in open position, a lever, link connections between said lever and false bottom and a weight operating on said lever to normally maintain the false bottom in its uppermost position.

3. In a nest, the combination with a box-like structure provided with an entrance opening and an exit opening, of a pair of closure plates fulcrumed at their lower inner corners and adapted to be oscillated in a vertical plane to and from each other, a false bottom pivoted adjacent to the exit opening, links, one connected to each closure plate and to the false bottom, means to normally maintain the false bottom in its uppermost position, a swinging door provided with an opening mounted over said exit opening, and means normally to maintain said door closed.

In witness that I claim the foregoing I have hereunto subscribed my name this 18th day of February, 1914.

CHRISTOPHER R. BROWN.

Witnesses:
EDMUND A. STRAUSE,
MARIE BATTEY.

Copies of this patent may be obtained for five cents each, by addressing the "Commissioner of Patents, Washington, D. C."